(12) United States Patent
Yuan

(10) Patent No.: US 8,221,875 B2
(45) Date of Patent: Jul. 17, 2012

(54) VARNISH, PREPREG, AND SUBSTRATE THEREOF

(75) Inventor: Yan Hua Yuan, Wuxi (CN)

(73) Assignee: ITEQ (WUXI) Electronic Technologies Co., Ltd., Jiangsu Province (CN)

( * ) Notice: Subject to any disclaimer, the term of this patent is extended or adjusted under 35 U.S.C. 154(b) by 351 days.

(21) Appl. No.: 12/588,669

(22) Filed: Oct. 23, 2009

(65) Prior Publication Data

US 2011/0098398 A1   Apr. 28, 2011

(51) Int. Cl.
| | |
|---|---|
| B32B 27/38 | (2006.01) |
| B32B 27/04 | (2006.01) |
| C08L 63/00 | (2006.01) |
| C08K 3/34 | (2006.01) |

(52) U.S. Cl. ............... 428/301.4; 428/297.4; 428/300.7; 428/413; 428/414; 428/901; 523/443; 523/466

(58) Field of Classification Search .................. None
See application file for complete search history.

(56) References Cited

U.S. PATENT DOCUMENTS

| | | | | |
|---|---|---|---|---|
| 4,529,790 | A * | 7/1985 | Kamio et al. | 528/107 |
| 6,548,159 | B2 * | 4/2003 | Tsai et al. | 428/325 |
| 2010/0092764 | A1 * | 4/2010 | Chung et al. | 428/331 |

* cited by examiner

*Primary Examiner* — Michael J Feely

(74) *Attorney, Agent, or Firm* — Rosenberg, Klein & Lee

(57) ABSTRACT

A varnish includes an epoxy resin, a curing agent, an accelerator agent and fillers. The fillers include sericite powders. The sericite powders have composition of $SiO_2$ in weight ratio of 55±3%. Furthermore, the Mohs' scale of hardness of the sericite powder is between 2 to 3. Glass fabric cloth is dipped into the varnish so as to form a prepreg with better machined-work capability.

15 Claims, No Drawings

VARNISH, PREPREG, AND SUBSTRATE THEREOF

BACKGROUND OF THE INVENTION

1. Field of the Invention

The present invention relates to a varnish and a prepreg, in particular to a varnish containing with sericite powders, a prepreg made from the varnish, and a substrate made from the prepreg or prepregs.

2. Description of Related Art

A printed Circuit Board (PCB) is made by laminating pressing and curing the laminated prepregs, copper clad laminate (CCL), or copper film. The prepregs are made, generally, by dipping glass fabrics into vanish and then curing the fabrics to form thin prepregs.

A PCB is made by pressing the prepregs, copper clad laminate (CCL), or copper film. The prepregs are made by dipping glass fabrics into varnish and then curing the fabrics to form thin prepregs. In seeking enhancement of environmental protection, lead-free solder is more and more widely used for assembly in electronic applications. However, this necessitates that the process temperature must be increased by about 30 to 40° C. for the lead-free solder processes and it is necessary to improve the heatproof or heat-resistance properties of the PCBs so the PCBs can be used in higher temperature process.

Traditionally, the originally-used DICY (dicyandiamide) curing agent with polarity and higher water absorption is replaced for the phenol curing agent with a benzene ring structure. Furthermore, inorganic silico-powders are usually added into the varnish to improve the heat-resistance properties of the PCBs. However, the inorganic silico-powders have high hardness and the manufactured prepregs/substrates are too hard and brittle to be machined. For example, while drilling on the hard and brittle substrates, the surfaces of the drilled holes are rough, or the laminated layers of the substrate are de-laminated. There are often cracks inside the substrate. In these circumstances, the drill bit is easily broken and the error rate and manufacturing cost is increased.

In other words, the harder silico-powders, such as $SiO_2$ powders with Mohs' scale of 7, are added into the varnish and the hard fillers cause low machining capabilities in the manufactured prepregs/substrates.

Therefore, in view of these difficulties, the inventor has developed ways to overcome these difficulties to yield dependable product with reliable results in production; the present invention addresses these difficulties and allows reliable production at high speed and overcomes the above problems.

SUMMARY OF THE INVENTION

The primary objective of the present invention is to provide a varnish having useful properties for electronics use. The varnish contains fillers which have sericite powders and the sericite powders are used for improving the machining property of the prepreg/substrate. The composition and the particle size of the sericite powders are studies for maintaining the chemical characteristics of the varnish. Furthermore, the prepregs made by the varnish has characteristics of high anti-flammability, higher heat-resistance/tolerance, and low moisture absorption.

To achieve the above-mentioned objective, the present invention provides a varnish. The varnish includes: composition (A): an epoxy resin, composition (B): a curing agent, composition (C): an accelerator, and composition (D): fillers, wherein the fillers are sericite (a product of mica) powders, the sericite powders have composition of $SiO_2$ in weight of 55±3%, and a Mohs' scale of hardness of the sericite powders is ranged from 2 to 3.

The present invention provides a varnish which, when used properly will yield a prepreg which is manufactured by dipping the glass fibers or fabrics into the varnish and then curing and drying the dipped fabrics.

The present invention further provides a substrate by laminating the prepreg into the substrate for a PCB.

The sericite powders with Mohs' scale of 2-3 are added into the varnish and the softer fillers of the sericite powders can be provided for improving the machining property of the prepregs/substrates. The weight ratio of the $SiO_2$ of the sericite powders is studied so as to control the chemical characteristics of the varnish. Moreover, the particle size of the sericite powders is further controlled to avoid detrimental reaction between the resin and the added powders.

In order to further understand the techniques, means, and effects the present invention takes for achieving the prescribed objectives, the following detailed descriptions and appended drawings are hereby referred, such that, through which, the purposes, features, and aspects of the present invention can be thoroughly and concretely appreciated; however, the appended drawings are provided solely for reference, demonstration, clarity and illustration, without intent that they will be used for limiting the present invention.

DETAILED DESCRIPTION OF THE PREFERRED EMBODIMENTS

The present invention provides a varnish which is mixed with fillers of sericite powders. The varnish with the sericite powders is used for dipping or otherwise applying to glass fiber and increasing the curing rate of prepregs made from this combination of filled resin and glass fiber fabric. In beneficial enhancement, the glass transition temperature (Tg) of the substrate made by the prepregs provided by this invention is increased. Still further, the sericite powders having the useful property of lower hardness are added into the varnish for improving the machining properties of the substrate.

In other words, because of the lower hardness of the sericite powders which are added into the varnish, the manufactured substrates have improved machining property and are more suitable for being drilled and having other machining operations performed thereon. Moreover, the compositions of the sericite powder, such as aluminium oxide and magnesium oxide are monitored and controlled in a manner to decrease the reaction of the sericite powders and the varnish. Thus, contamination issues of varnish are avoided by controlling the reactivity which appears to increase with diminishing particle size of the mineral-derived filler.

Experiments are shown in Table. 1. The varnish of the present invention has: composition (A): an epoxy resin, composition (B): a curing agent, composition (C): an accelerator, and composition (D): fillers of sericite powders. The compositions of the varnishes are shown in Table. 1.

TABLE 1

| | composition | parts | Example 1 | Comparison 1 | Comparison 2 | Comparison 3 | Comparison 4 |
|---|---|---|---|---|---|---|---|
| epoxy resin | brominated novolac epoxy resin, bisphenol-A novolac epoxy resin, tetrafunctional | primary part | 100 | 100 | 100 | 100 | 100 |

TABLE 1-continued

| | | unit | | | | | |
|---|---|---|---|---|---|---|---|
| | epoxy resin (FR4 epoxy resin) | | | | | | |
| phenol curing agent | bisphenol-A novolac curing agent | relative part | 30 | 30 | 30 | 30 | 30 |
| accelerator | 2-ethyl-4-methylimidazole | relative part | 0.06 | 0.06 | 0.06 | 0.06 | 0.06 |
| silane coupling agent | Silane coupling agent | relative part | 0.04 | 0.04 | 0.04 | 0.04 | 0.04 |
| solvent | PM, MEK | relative part | 60 | 60 | 60 | 60 | 60 |
| filler 1 | sericite powders ($SiO_2$ 55 ± 3%, particle size 3 ± 1 um) | relative part | 30 | — | — | — | — |
| filler 2 | sericite powders ($SiO_2$ 55 ± 3%, particle size <2 um) | relative part | — | 30 | — | — | — |
| filler 3 | sericite powders ($SiO_2$ 63%, particle size 3 ± 1 um) | relative part | — | — | 30 | — | — |
| filler 4 | sericite powders ($SiO_2$ 49%, particle size 3 ± 1 um) | relative part | — | — | — | 30 | — |
| filler 5 | quartz powders ($SiO_2$ >99%) | relative part | — | — | — | — | 30 |

| | Testing items | unit | Example 1 | Comparison 1 | Comparison 2 | Comparison 3 | Comparison 4 |
|---|---|---|---|---|---|---|---|
| Sample test | gelation time | sec | 270 ± 5 | 360 ± 5 | 270 ± 5 | 300 ± 5 | 270 ± 5 |
| | Tg | °C. | 141 | 132 | 141 | 138 | 142 |
| | peeling strength | lbs/inch | 7.99 | 6.21 | 7.98 | 6.85 | 8.23 |
| | moisture absorption | % | 0.48 | 0.58 | 0.47 | 0.62 | 0.47 |
| | float at 288° C. | min | >8 | <5 | >8 | <5 | >8 |
| | roughness of side wall of drilled holes | mil | 0.92 | 0.85 | 1.02 | 0.93 | 1.23 |

As shown in Table. 1, the epoxy resin has the primary composition with 100 parts, the epoxy resin is one of or more than one of the brominated novolac epoxy resin, bisphenol-A novolac epoxy resin, and tetrafunctional epoxy resin (FR4 epoxy resin), but not restricted thereby. The curing agent of composition (B) is a phenol curing agent, for example a bisphenol-A novolac curing agent which has 30 parts relative to the primary parts (i.e., 100 parts) of the composition (A).

As shown in Table. 1, the accelerator of composition (C) is 2-ethyl-4-methylimidazole having 0.06 parts relative to the primary parts of the composition (A). On the other hand, the varnish further has solvent of composition (F) and the solvent has 60 parts relative to the primary parts of the composition (A). In the Embodiment 1 and Comparisons 1-4, the solvent of composition (F) can be any one of or more than one of: methyl ethyl ketone (MEK), propylene glycol monomethyl ether (PM), and cyclohexanone.

In addition, the varnish further has composition (E): additives. The additives can have one or more surfactant), such as a coupling agent or another additive. In the Embodiment 1 and Comparisons 1-4, the varnish has a silane coupling agent with 0.04 parts by weight relative to 100 parts by weight of the composition (A). The silane coupling agent is used in the varnish for improving the surface activity of the inorganic powders. Thus, the physical characteristics of the composite material, such as strength and wear-resistance, can be improved. The silane coupling agent has a silicone monomer with at least two different functional groups. One of the functional groups can be linked with the inorganic powders and the other functional group can be connected to the resin material. Therefore, the silane coupling agent is used for increasing the intimate attraction of the resin and the filled powders so as to improve the anti-flammability or flammability and machining properties.

The compositions of the sericite powders are different in Embodiment 1 and Comparisons 1-3, and traditional quartz powders are filled into the varnish. In addition, eight prepregs made by the Embodiment 1 and Comparisons 1-4 are respectively laminated with copper film of 1 oz to form the copper clad laminate (CCL) and then the CCLs are tested for the characteristics shown in Table. 1.

The moisture absorption (i.e., water absorption) is determined by the water or moisture within the prepregs/CCLs. The moisture absorption of the prepregs/CCLs has to be controlled for preventing the situation of de-lamination. In general, the prepregs/CCLs are inspected by infrared (IR) or thermogravimetric analysis so as to determine the degree of moisture absorption.

The result of solder float resistance: the solder float test follows the instruction of IPC-TM-650 Method 2.4.13.1. The method tests heat-dissipation prepregs/CCLs in 288° C. and measures the time of the prepregs/CCLs failure (De-lamination).

The test of anti-flammability follows the instruction of UL 94 method. According to the degree of the anti-flammability, the testing results are rated as HB, V-2, V-1, V-0, and 5V so as to represent the anti-flammability of prepregs/CCLs. The testing prepreg is burned on the fire vertically and follows the following steps. Step 1 is burning the prepreg/CCL in fire for 10 seconds and then moving the prepreg/CCL away, and simultaneously counting the time period (T1) that the prepreg/CCL continues to burn after being removed from the fire. Step 2 is burning the prepreg/CCL in fire for 10 seconds again, then moving the prepreg/CCL away and simultaneously counting the time period (T2) that the prepreg/CCL continues to burn after being removed from the fire. Step 3 is repeating the steps 1 and 2, and calculating the mean value of T1 and T2. Step 4 is summing T1 and T2. According to the specific definition of UL 94, V-0, neither of the mean value of T1 and T2 is larger than 10 seconds, and the sum of T1 and T2 is no greater than 50 seconds.

In Table. 1, the Embodiment 1 is a preferable embodiment of the present invention. The composition of SiO2 in the sericite powders of the Embodiment 1 is 55±3% and the particle size of the sericite powders is ranged 3±1 um. According to the experimental data of Embodiment 1, the gelation time, the peeling strength and the moisture absorption of the prepreg/CCL of Embodiment 1 can meet the requirement of the product applications. Tg of the prepreg/CCL is analyzed about 141° C. and the high Tg means the reactivity manufactured prepregs/CCLs are improved. On the other hand, the result of Embodiment 1 presents that the de-lamination time of the prepreg/CCL of Embodiment 1 meets the requirement of the heatproof property. Moreover, the roughness of the drilled holes is lowered as 0.9 mil. Due to the softer powders (Mohs' scale of hardness of the sericite powders is ranged from 2 to 3) added into the varnish, the machining property of the prepreg/CCL of Embodiment 1 is improved so that the roughness of the drilled holes is lowered and the interconnection between layers is increased. On other hand, the SiO2 of the sericite powders is modified as silanized silica by the silane coupling agent so that the modified powders are more compatible with the resin and the physical characteristics of the manufactured prepregs/CCLs are improved.

In Comparison 1, the sericite powders have SiO2 in weight ratio of 55±3%, but the particle size of the sericite powders is less than 2 um. Comparing with Comparison 1 and Embodiment 1, the prepregs/CCLs of Comparison 1 has longer gelation time. The longer gelation time is resulted from the larger surface area of the sericite powders with smaller particle size. In other words, because of the larger surface area of the sericite powders, the resin is reacting with the sericite powders and the chemical characteristics of the varnish are changed so that the curing reactions of the resin the accelerator and the curing agent to the resin does not take effect efficiently. Although the roughness of the drilled holes on the prepregs/CCLs of Comparison 1 is lowered as 0.85 mil, the chemical properties of the varnish cannot meet the requirements of manufacturing processes. To summary, the particle size of the sericite powders has a minimum limit for controlling the chemical properties of the varnish.

In Comparison 2, the sericite powders have SiO2 in weight ratio of 63%, and the particle size of the sericite powders is 3±1 um. Comparing with Comparison 2 and Embodiment 1, the roughness of the prepregs/CCLs of Comparison 2 is increased to 1.02 mil because of the higher hardness of the manufactured prepregs/CCLs, which is resulted from the harder sericite powders. In other words, the sericite powders is harder with the increasing composition of SiO2, and the harder prepregs/CCLs are manufactured by adding the sericite powders with the increasing composition of SiO2. In the condition of harder prepregs/CCLs, the roughness of the drilled holes is increased and the quality of the prepregs/CCLs cannot be qualified.

In Comparison 3, the sericite powders have SiO2 in weight ratio of 49%, and the particle size of the sericite powders is 3±1 um. Comparing with Comparison 3 and Embodiment 1, the prepregs/CCLs of Comparison 3 has longer gelation time. The longer gelation time is resulted from the sericite powders with more weight ratio of another oxide. For example, the more weight of aluminium oxide and magnesium oxide results in the reaction between the resin and the sericite powders. Thus, the result of the longer gelation time of Comparison 3 is similar with the result of Comparison 1. On the other hand, the heatproof property of the prepregs/CCLs of Comparison 3 is too low (according to the solder float test) and the moisture absorption of the prepregs/CCLs of Comparison 3 is too high.

In Comparison 4, the traditional quartz powders having SiO2 in weight ratio above 99% are added into the resin. Comparing with Comparison 4 and Embodiment 1, the roughness of the prepregs/CCLs of Comparison 4 is calculated as above 1.2 mil. In other words, the traditional quartz powders cannot improve the machining property of the prepregs/CCLs.

A method for manufacturing a prepreg using the varnish is disclosed in the present invention. The varnish is provided and the varnish has composition (A): an epoxy resin, composition (B): a curing agent, composition (C): an accelerator, and composition (D): fillers which includes sericite powders, and the sericite powders has composition of SiO2 in weight of 55±3%, and a Mohs' scale of hardness of the sericite powders is ranged from 2 to 3. The glass fabrics are dipped into the varnish so as to manufacture a prepreg, PP, or copper clad laminate (CCL) with good machining properties. The above-mentioned prepregs are applied for manufacturing the substrate of PCB, and the substrate has improved machining properties. For example, after drilling on the substrate, the drilled holes have smooth inner surfaces.

In summary, the present invention has the following advantages.

1. The sericite powders with Mohs' scale of 2-3 are added into the varnish and the softer fillers can be provided for improving the machining property of the prepregs/substrates.

2. The size and the composition of the sericite powders are studies to avoid the reaction between the resin and the filler powders. Therefore, the varnish of the present invention is maintained in high stability. Furthermore, the properties of the prepregs/substrates, such as moisture absorption and heatproof, can be meet the requirement of applications.

The above-mentioned descriptions represent merely the preferred embodiment of the present invention, without any intention to limit the scope of the present invention thereto. Various equivalent changes, alternations, or modifications based on the claims of present invention are all consequently viewed as being embraced by the scope of the present invention.

What is claimed is:

1. A varnish, comprising:
   composition (A): an epoxy resin;
   composition (B): a curing agent;
   composition (C): an accelerator;
   composition (D): fillers, wherein the fillers are sericite powders, the sericite powders comprising 55±3 weight % of a composition of $SiO_2$ and having a Mohs' scale of hardness ranging from 2 to 3; and
   composition (F): solvent, wherein the solvent is present in an amount of 60 parts by weight relative to 100 parts by weight of the composition (A).

2. The varnish according to claim 1, wherein the sericite powders of the composition (D) are present in an amount of 30 parts by weight relative to 100 parts by weight of the composition (A).

3. The varnish according to claim 2, wherein each of the sericite powders of the composition (D) has particle size of 3±1 μm.

4. The varnish according to claim 3, wherein the epoxy resin of the composition (A) is one of or more than one of brominated novolac epoxy resin, bisphenol-A novolac epoxy resin, and tetrafunctional epoxy resin.

5. The varnish according to claim 3, wherein the curing agent of the composition (B) is a phenol curing agent.

6. The varnish according to claim 5, wherein the phenol curing agent is a bisphenol-A novolac curing agent.

7. The varnish according to claim 6, wherein the bisphenol-A novolac curing agent is present in an amount of 30 parts by weight relative to 100 parts by weight of the composition (A).

8. The varnish according to claim 3, wherein the accelerator of the composition (C) is 2-ethyl-4-methylimidazole.

9. The varnish according to claim 8, wherein the 2-ethyl-4-methylimidazole is present in an amount of 0.06 parts by weight relative to 100 parts by weight of the composition (A).

10. The varnish according to claim 3, further comprising: composition (E) additives.

11. The varnish according to claim 10, wherein the additives include a surfactant.

12. The varnish according to claim 11, wherein the surfactant is a silane coupling agent, and the silane coupling agent is present in an amount of 0.04 parts by weight relative to 100 parts by weight of the composition (A).

13. The varnish according to claim 1, wherein the solvent of the composition (D) includes one of or more than one of methyl ethyl ketone, propylene glycol monomethyl ether, and cyclohexanone.

14. A prepreg manufactured by dipping glass fabrics into the varnish of claim 1.

15. A substrate of printed circuit board manufactured by laminating the prepreg of claim 14.

* * * * *